Dec. 6, 1960   A. VISCHER, JR   2,963,041
RELIEF VALVES FOR FLEXIBLE WALL CONTAINERS
Filed June 2, 1955   2 Sheets-Sheet 1

INVENTOR
Alfred Vischer Jr.
BY
Mason, Kolehmainen,
Rathburn and Wyss
ATTORNEYS

Dec. 6, 1960 A. VISCHER, JR 2,963,041
RELIEF VALVES FOR FLEXIBLE WALL CONTAINERS
Filed June 2, 1955 2 Sheets-Sheet 2
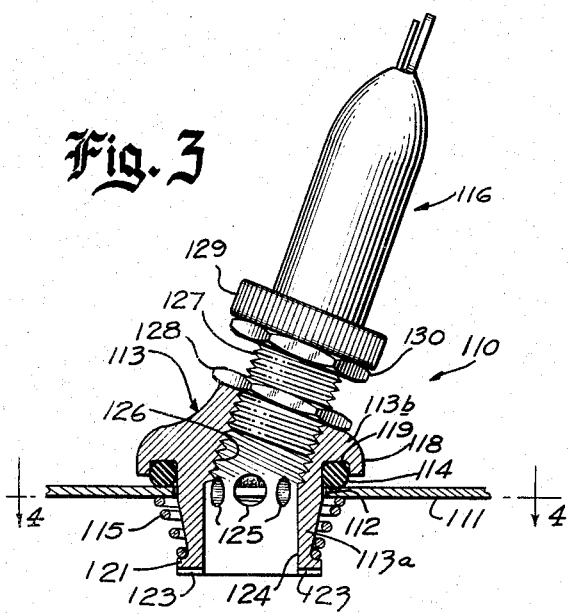
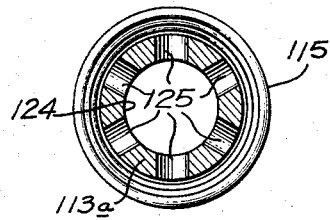
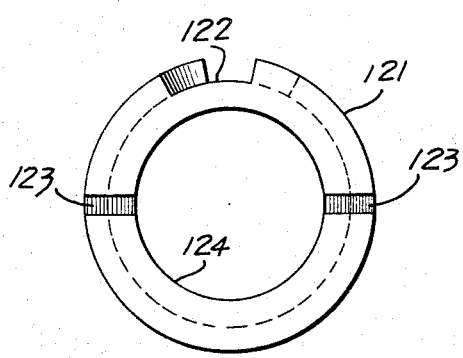
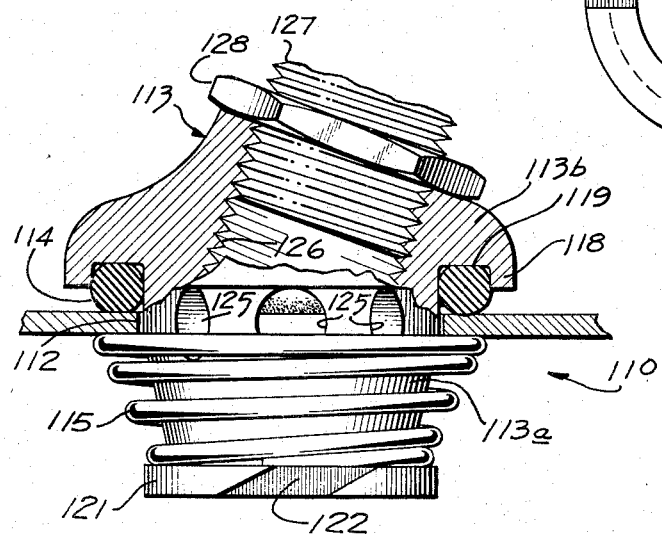
INVENTOR.
Alfred Vischer Jr.
BY
Mason, Kolehmainen, Rathburn & Wyss
ATTORNEYS

United States Patent Office 2,963,041
Patented Dec. 6, 1960

2,963,041
RELIEF VALVES FOR FLEXIBLE WALL CONTAINERS

Alfred Vischer, Jr., Park Ridge, Ill., assignor of two-thirtieths to William Vischer, two-thirtieths to Alfred Vischer, III, two-thirtieths to Alfred Vischer, Jr., as trustee, four-thirtieths to Walter W. Zitzewitz, four-thirtieths to Elmer K. Zitzewitz, one-thirtieth to Gertrude J. Zitzewitz, one-thirtieth to Barbara O. Zitzewitz, and two-thirtieths to Gertrude V. Bouton Filed June 2, 1955, Ser. No. 512,754

8 Claims. (Cl. 137—541)

The present invention relates to valves, and more particularly to improvements in pressure relief valves of the type suitable for use in pressure cookers.

Although pressure cookers are built to resist internal pressures greatly exceeding that pressure at which they are intended to be used, in order to prevent possible explosion of the cookers, a valve is provided for relieving the internal pressure when it exceeds a predetermined value. The relief valve is most conveniently mounted on the cover of the cooker, and when the cover is relatively thin such as, for example, as is the case with the flexible cover used in the pressure cooker disclosed in Vischer Patent No. 2,282,011, issued May 5, 1952, and assigned to the same assignee as the present invention, the prior art type relief valves leave much to be desired.

Therefore, an object of the present invention is to provide a new and improved pressure relief valve suitable for use with pressure cookers or other pressurized vessels.

Another object of the present invention is to provide an improved safety valve having a small number of components and which may be used in conjunction with pressure cookers having thin covers.

A further object of the invention is to provide a new and improved pressure relief valve which is simple and compact in design, inexpensive to manufacture, reliable in operation and suitable for use with pressurized vessels such as, for example, pressure cookers.

Briefly, the above objects are realized in accordance with the present invention by the provision of a relief valve which utilizes a portion of a wall of the pressurized vessel as the valve seat and which is secured to the vessel through a simple aperture provided in the wall, no threaded, webbed or other complex arrangements being required on the cover.

The invention, both as to its organization and method of operation, together with further objects and advantages thereof, will best be understood by reference to the following detailed description taken in connection with the accompanying drawings in which:

Fig. 3 is an elevational view, partially in section, of an alternative embodiment of the invention;

Fig. 4 is a sectional view of the device of Fig. 3 taken along the line 4—4 thereof;

Fig. 5 is an enlarged view of a portion of the device of Fig. 3, certain parts thereof being shown in section; and Fig. 6 is a bottom view of a portion of the device of Fig. 5.

Figure 1:
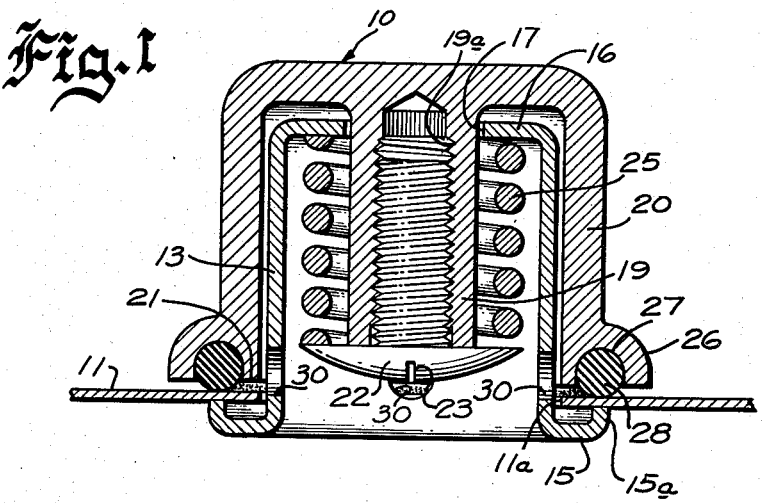
Fig. 1 is a sectioned, elevational view of a relief valve embodying the present invention.
Figure 2:
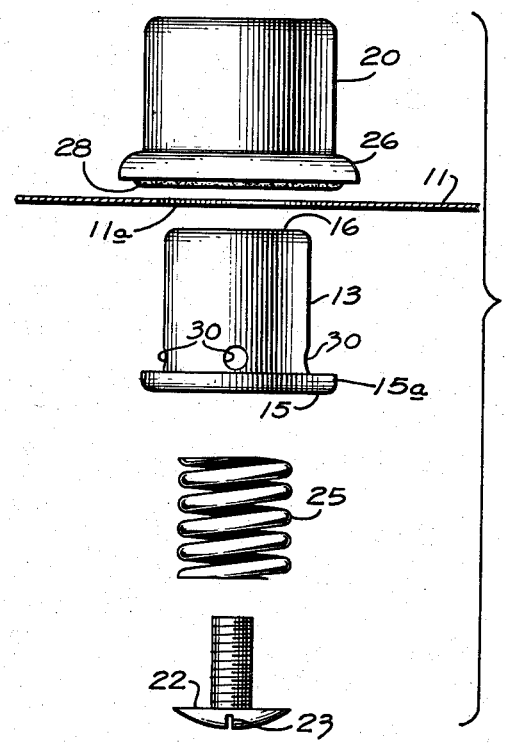
Fig. 2 is an exploded view of the valve shown in Fig. 1.

Referring now to the drawings, and particularly to Figs. 1 and 2 thereof, a pressure relief or safety valve 10 is mounted on a cover 11 of a pressure cooker (not shown). The cover 11 may be relatively thin having, for example, a thickness of the order of one thirty-second of an inch, and is provided therein with an aperture 11a through which extends a portion of the safety valve 10 for attachment thereof to the cover 11.

Briefly, the valve 10 comprises a movable valve member or casing 20 mounted on the outside of the cover 11 with an annular seating portion adapted resiliently to be urged against the cover 11 throughout an area surrounding the aperture 11a by means including a spring 25 operatively interposed between the bottom of the cover 11 and the valve member 20 through a perforated tubular member 13. It will thus be seen that a portion of the cover 11 surrounding the aperture 11a provides a valve seat against which the valve member 20 is resiliently urged, thereby to provide a seal between the top and bottom of the cover 11, which valve is opened upon occurrence of excess pressure within the vessel. It will also be seen that the principal portions of the valve 10 are located outside of the vessel so as not to depend from the cover 11 into the vessel.

Considering the valve 10 in greater detail, the sleeve member 13 is generally cup-shaped having an outwardly extending annular flange 15 at the lower end thereof which is adapted to extend beyond the walls of the aperture 11a so as to prevent the sleeve 13 from being withdrawn from the pressure cooker through the aperture 11a. The upper portion of the sleeve 13 is inwardly directed so as to provide an annular flange 16 defining a circular aperture 17 through which extends a boss 19 which depends within the cavity in the valve member 20. The boss 19 has a threaded bore 19a opening within the sleeve 13 and to which is removably secured a headed screw 22 having a slot 23 provided in the head portion thereof for accommodation of a screw driver. The helical coil spring 25 surrounds the boss 19 between the flange 16 and the head of the screw 22, thereby to urge the rim 21 of the valve member 20 toward the flange 15 on the sleeve 13. Since the cover 11 is interposed between the rim 21 and the flange 15, the rim is resiliently urged into contact with the cover 11 throughout an area surrounding the aperture 11a. In order to provide a fluid-tight seal between the rim 21 and the cover 11 when they are forced into mutual contact by the spring 25, an outwardly extending annular flange 26 in the bottom surface of the valve member 20 is provided with a semi-toroidal groove 27 for the accommodation of a resilient sealing ring 28, the member 28 conveniently being a rubber or suitable plastic O ring.

As thus far described, it may be seen that with the valve 10 assembled to the cover 11 as shown in Fig. 1, the sealing ring 28 is urged under the force provided by the spring 25 firmly against the top of the cover 11 around the aperture 11a so as to provide a fluid-tight seal between the inside and outside of the cooker.

Although the pressure in the cavity in the valve member 20 will be equalized with the pressure within the cooker since a loose fit is provided between the boss 19 and the wall of the aperture 17, in order to minimize the time required for the steam to be released from the cooker so as to drop the internal pressure of the cooker below the safe operating value when the ring 28 is moved away from the cover 11 by the force exerted on the valve member 20 by the steam in the cooker, a plurality of apertures 30 are provided in the sleeve 13 near the bottom thereof substantially in line with the top of the cover 11. It may thus be seen that when the internal pressure in the cooker forces the housing and, therefore, the ring 28 out of engagement with the cover 11, the steam in the cooker is released through the apertures 30 and beneath the ring 28 thereby to reduce the pressure within the cooker.

As heretofore indicated, the valve 10 may be used with pressure cookers of the type disclosed in the above-identified patent, and therefore, the cover 11 may be relatively thin and flexible so that it becomes important that the cover 11 not be deformed in the immediate vicinity of the valve 10 by the pressure within the cooker since variations in the pressure required to release the valve might result. Therefore, the outwardly extending ends of the flange 15 are upturned at 15a so as to engage the bottom of the cover throughout an annular area directly beneath that annular area at the top of the cover which is engaged by the ring 28. By so shaping the lower portion of the sleeve 13 it will be apparent that any distortion of the cover 11 is ineffective to change the pressure at which the housing 20 moves out of engagement with the cover 11. Therefore, only the spring 25 and the various dimensions of the valve parts determine this value of pressure at which the valve 10 is actuated, and since these dimensions are readily controllable, the safety valve 10 provides good reliability in a simple and inexpensive manner.

In order to assemble the valve 10 to a pressure cooker, the valve member 20 and the sealing ring 28 are first assembled together and positioned on the outside of the cover 11 over the aperture 11a. The sleeve 13 is then inserted from the bottom of the cover through the aperture 11a and into the recess defined within the member 20 with the boss 19 depending within the sleeve 13 through the aperture 17. The coil spring 25 is then inserted over the boss 19 into engagement with the flange 16 and the screw 22 is fully threaded into the boss 19 thereby to secure the valve to the cover 11.

The valve prevents the escape of steam until the pressure exceeds the force exerted by the spring 25. When this occurs the member 20 moves away from the cover 11 and the steam is released from the cooker through openings 30 and under seat 28 until such time as the pressure within the vessel becomes insufficient to hold the ring 28 disengaged from the cover 11, whereupon spring 25 recloses the valve. By a proper selection of the strength of the spring 25, this pressure may be chosen to be the maximum safe operating pressure of the cooker.

In another embodiment of the invention which is illustrated in Figs. 3–6, inclusive, a pressure relief or safety valve 110 to which is attached a pressure indicator 116, is mounted on a cover 111 of a pressure cooker (not shown). The cover 111, which may, as in the case of the cover 11 in Figs. 1 and 2, be relatively thin, is provided with an aperture 111a through which extends a portion of the safety valve 110 for attachment thereof to the cover 111.

Briefly, the valve 110 comprises a valve member or casing 113 mounted on the outside of the cover 111 with an annular portion including a resilient sealing ring 114 adapted to be urged against the cover 111 throughout an area surrounding the aperture 112 by means including a spring 115, operatively interposed between the bottom of the cover 111 and the valve member 113 through a perforated tubular member 113a. It will thus be seen that a portion of the cover 111 surrounding the aperture 111a provides a valve seat against which the valve member 113 is resiliently urged, thereby to provide a seal between the top and bottom of the cover 111, which valve is opened upon occurrence of excess pressure within the cooker.

Considering the valve 110 in greater detail, the outer wall of the tubular member 113a which is integral with and depends from the valve member 113 is tapered, the taper terminating in a flange 121 which extends outwardly from the lower end of the portion 113a. The helical spring 115 which is interposed between the flange 121 and the bottom of the cover 111 and surrounds the stem 113a, provides a biasing force between the flange 121 and the bottom of the cover 111 so as to resiliently urge the valve member 113 down through the aperture 112.

In order to effect a fluid-tight seal between the top and bottom of the cover 111, the upper or main body portion 113b of the member 113 is circular and larger in diameter than the aperture 112 and an annular resilient sealing member 114, constructed of rubber or any other suitable material, is supported intermediate the member 113 and the top of the cover 111. As shown in Figs. 3 and 5, the ring 114 thus surrounds the tubular portion 113a, and with the spring 115 partially compressed, the ring 114 is pressed between the plug 113 and the cover 111 to provide a fluid-tight seal around the aperture 112. Since it is undesirable to remove the safety valve 110 from the cover 111 during washing and storage of the pressure cooker, in furtherance of protecting the sealing member 114 from possible damage, a downwardly extending annular flange 118 extends from the upper portion 113b thereby to define an annular recess 119. In addition to providing a protective enclosure for the sealing ring 114, the walls of the recess effect a three point contact between the ring 114 and the valve member 113 so as to insure the provision of a fluid-tight seal.

In order to insure reliable operation of the valve 110 irrespective of the degree of flexibility of the cover 111, the pitch diameter of the upper coil of the spring 115 substantially equals that of the ring 114 and is disposed directly beneath that portion of the cover 111 which provides the valve seat.

So as to facilitate the assembly of the valve 110 to the cover 111, the spring 115 is tapered to substantially conform to the shape of the outer wall of the depending portion 113a and the flange 121 is provided with a groove 122 through which the helix of the spring 115 passes as the spring 115 is screwed into place over the flange 121. When the top of the spring 115 abuts against the bottom of the cover 111, the bottom of the spring 115 abuts against the top of the flange 121 whereupon the valve 110 is completely assembled to the cover 111. In order to disassemble the valve 110 from the cover 111, the lower end of the spring 115 is threaded into the groove 122 and the spring is rotated with respect to the valve member 113 in a counterclockwise direction as viewed from the bottom thereof.

As best shown in Fig. 4, a plurality of slotted recesses 123 are provided in the bottom surface of the tubular portion 113a to prevent the bore 124 from becoming plugged should a large item of food such as, for example, a potato, become wedged against the bottom of the valve member 113.

In order to facilitate attachment of the pressure indicating device 116 to the member 113 so that the pressure within the cooker is communicated to it, a threaded bore 126, which opens into the bore 124 in the tubular portion 113a, is provided, and the device 116 is conveniently attached thereto by means of any suitable coupling arrangement, such as, for example, the hollow threaded stud 127 and a nut 128. Since the pressure indicating device 116 and its associated coupling arrangement are well known in the art and do not, per se, constitute the present invention, for purposes of clarity a thorough description thereof is not given. Briefly, however, the nut 128 frictionally engages the surface of the member 113 which surrounds the bore 126, thereby to prevent undesired removal of the device 116 from the remainder of the valve 110, and a nut 130 together with its associated locking ring 129 are used to adjust the pressure required to be supplied to the device 116.

Since it is desirable that the pressure in the cooker be reduced as quickly as possible when it reaches the maximum safe operating level, the tubular portion 113a is perforated by means of a plurality of circular openings 125 which are located at such a position that when the member 113 is forced away from the cover 111, the steam will pass through the apertures 125 and under the sealing member 114 out of the cooker. By thus providing an exit passageway of large cross-sectional area, rapid reduction of the pressure in the cooker is assured when the sealing ring 114 is disengaged from the cover 111 by the pressure within the vessel overcoming the force of the spring 125.

It will be understood that the valves shown in the drawings to describe the invention may be readily modified without departing from the invention. For example, the threaded bore 126 in the valve member 113 need not be provided when the pressure indicating device 116 is not required, and similarly, if desired, an audio alarm sounding device may be provided in conjunction with the valve 110 by providing a plurality of apertures in the top of the valve member 113 and securing an alarm device to the valve member 113 over the apertures so provided. Therefore, by the appended claims it is intended to cover all such changes and modifications as fall within the true spirit and scope of the invention.

Having thus described my invention, what I desire to secure by United States Letters Patent is:

1. In a pressurized vessel having an aperture in a flexible wall portion thereof, a seat defining surface on said wall portion surrounding said aperture, a valve member movably mounted on one side of said wall portion, spring means having one end engaging the other side of said wall portion throughout an area surrounding said aperture, said area substantially corresponding in size and location to said seat defining surface, and said spring means having its other end operatively connected to said valve member resiliently to bias it against said seat defining surface whereby said spring means applies a uniform force to said wall portions throughout said seat defining surface about said aperture.

2. A safety valve comprising a flexible pressure vessel cover having an aperture therein, an imperforate housing having an annular sealing portion adapted to contact one side of said cover throughout an area surrounding said aperture, a perforated tubular member received in said aperture, a coil spring disposed concentrically with said tubular member, an annular flange on said tubular member, one end of said spring being in engagement with said flange, said spring and said tubular member being operatively interposed between said housing and the other side of said cover in an area adjacent said aperture and directly opposite the area on the said one side of said cover engaged by said sealing portion, and another annular flange on said tubular member, said last-mentioned flange engaging said area on said other side of said cover, thereby to provide a compressive bias force between said cover and said housing to urge said annular sealing portion into engagement with said cover.

3. A safety valve comprising an aperture support, a recessed valve member including a sealing rim which is adapted to contact one side of said support around said aperture, a tubular member having an annular flange at each end, said tubular member being positioned within said aperture with the ends thereof extending outwardly from the opposite sides of said support, an end of said tubular member extending within the recess in said valve member above said sealing rim, a coil spring, one end of said coil spring acting on the flange within the recess and the other end thereof engaging a portion of said valve member whereby said coil spring and said tubular member are operatively interposed between said valve member and said opposite side of said support.

4. A safety valve comprising an imperforate valve member having an annular sealing portion surrounding a recess in said valve member, a sleeve having an inwardly directed flange at one end and an outwardly directed flange at the other end, said sleeve being partially disposed in said recess, a longitudinal member aligned with and located within said sleeve and having one end secured to said valve member, said longitudinal member having an outwardly directed flange displaced from said one end, and spring means interposed between said inwardly directed flange on said sleeve and said outwardly directed flange on said longitudinal member.

5. A safety valve comprising a housing defining a recess, continuous sealing means on said housing surrounding said recess, a perforated tubular member partially extending within said recess and having an inwardly directed annular flange at the end thereof which is disposed within said recess, said tubular member having an outwardly directed annular flange at its other end, a boss on said housing extending within said tubular member through the aperture defined by said inwardly directed annular flange, a coil spring surrounding said boss and having one end thereof abutting said inwardly directed flange, and removable means on said boss engaging the other end of said spring to prevent the movement of said one end of said spring away from said inwardly directed flange.

6. A pressure relief valve suitable for use with a pressure cooker, comprising a thin cover portion in which is provided an aperture, a recessed housing having the rim thereof adapted to engage the outside of said cover throughout an area surrounding said aperture, a perforated tubular sleeve partially extending through said aperture, said sleeve being partially disposed within said housing and having an annular flange adapted to engage the bottom of said cover, a standoff portion of said housing extending within the bore of said sleeve, a coil spring surrounding said standoff portion and engageable at one end with said sleeve, and means on said standoff portion for engaging the other end of said spring, whereby said housing is moved out of engagement with said cover to release steam from said recessed housing when the pressure therein exceeds a predetermined value.

7. A safety valve comprising an apertured member, a valve casing defining a recess therein, a sealing annulus on said casing surrounding said recess, a perforated member extending through said aperture and having means thereon for engaging said apertured member and thereby limiting the movement of said perforated member through said aperture toward said casing, a portion of said perforated member extending within said recess, and resilient means interconnected between said apertured member and said casing for urging said casing and said perforated member together.

8. In a pressurized vessel, a thin, flexible wall having an aperture therein, a seat defining surface on the unpressurized side of said wall surrounding said aperture, a valve member movably mounted on said unpressurized side of said wall, said valve member having a sealing portion adapted to engage said seat throughout an area surrounding said aperture, and means connected between said valve member and the other side of said wall directly opposite said seat for resiliently pressing said sealing portion against said seat.

References Cited in the file of this patent

UNITED STATES PATENTS

| | | |
|---|---|---|
| Re. 12,945 | Wheeler | Apr. 20, 1909 |
| 314,218 | Bolton | Mar. 24, 1885 |
| 636,391 | Smyth | Nov. 7, 1899 |
| 650,650 | Nichoff | May 29, 1900 |
| 892,886 | Prest | July 7, 1908 |
| 1,349,515 | Lombard | Aug. 10, 1920 |
| 1,462,519 | Rothe | July 24, 1923 |
| 2,138,412 | Trefz | Nov. 29, 1938 |
| 2,462,287 | Richeson | Feb. 22, 1949 |